Oct. 9, 1962          C. DAVIS          3,057,796

SEPTIC TANK STRUCTURE

Filed Oct. 30, 1959          2 Sheets-Sheet 1

INVENTOR
CLOYD DAVIS
BY Eugene S. Lovette
ATTORNEY

Oct. 9, 1962 C. DAVIS 3,057,796
SEPTIC TANK STRUCTURE
Filed Oct. 30, 1959 2 Sheets-Sheet 2
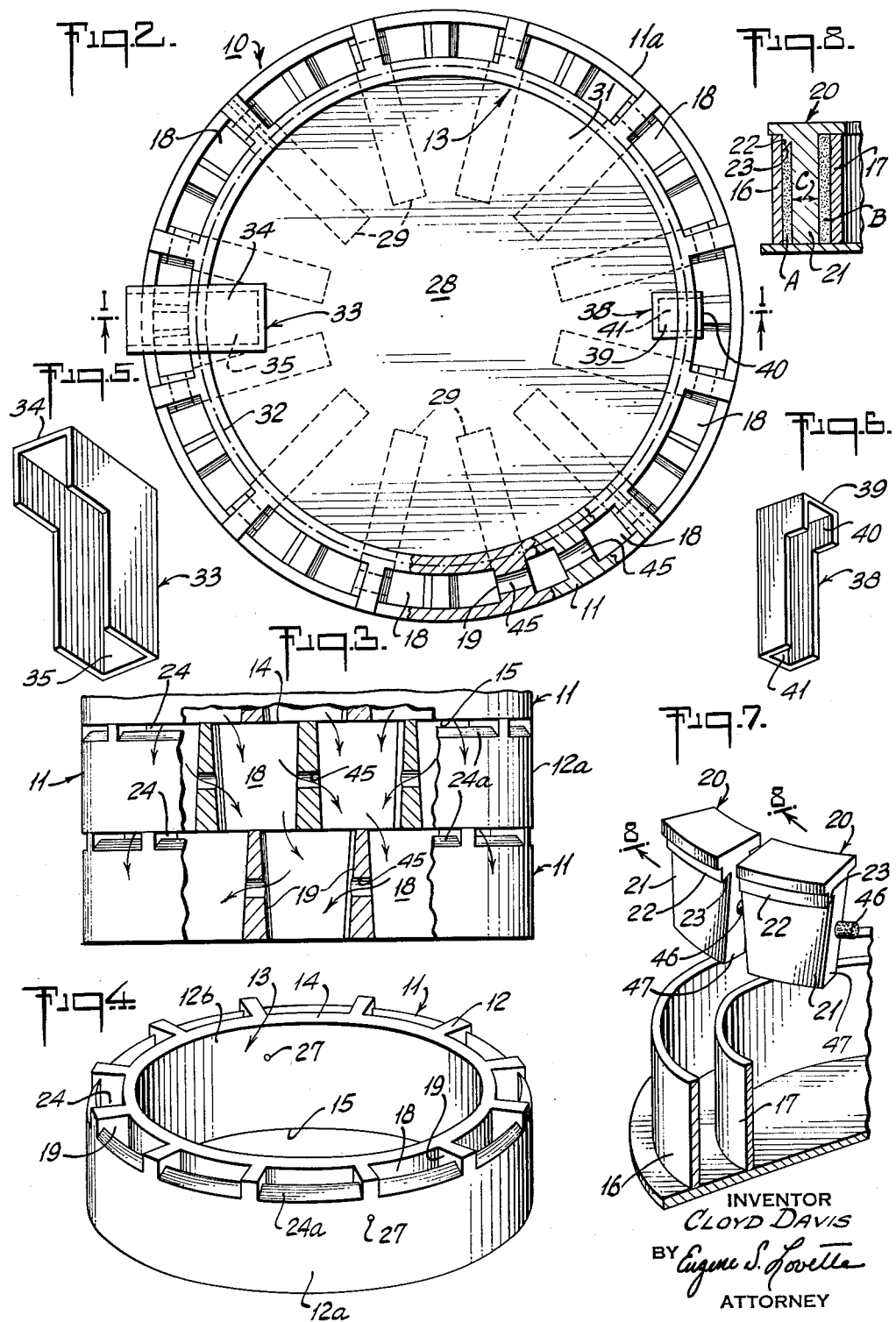
INVENTOR
CLOYD DAVIS
BY Eugene S. Lovetta
ATTORNEY

United States Patent Office 3,057,796
Patented Oct. 9, 1962

3,057,796
SEPTIC TANK STRUCTURE
Cloyd Davis, 31 Dartmouth St., Williston Park, N.Y.
Filed Oct. 30, 1959, Ser. No. 849,794
9 Claims. (Cl. 210—207)

The present invention relates to an improved septic tank for treating sewage wastes and, in particular, relates to septic tank means for effecting decomposition and treatment of sewage by bacteria, biochemical, physical and natural processes for the purpose of releasing clarified liquid waste to the sub-soil without clogging same.

It is a principal object of the present invention to provide improved septic tank structure, which structure is made up essentially of ring-shaped block members which afford substantial economy and ease in fabrication and assembly of the septic tank.

It is a further object of the present invention to provide a method for assembling a septic tank, an improved tank structure consisting essentially of ring-shaped block members which upon vertically stacking a plurality of same readily form the septic tank wherein the dispersive chambers of the septic tank are passages formed in the block members.

It is a further object of the invention to provide a septic tank structure which incorporates an inlet chamber supplied with air or an oxygen carrying gas for effecting an aerobic treatment of the waste passing through such chamber, wherein decomposition of the waste is aided by such treatment in operative combination with a subsequent anaerobic treatment in the main septic chamber and a further zoogloeal treatment in the drainage area surrounding the exterior of the septic tank.

It is a further object of the invention to provide improved sewer means operatively combining aerobic, anaerobic septic tank operation with zoogloeal treatment in a unitary structural sewage system in contrast to the customary prior art practice wherein leaching of the waste from the septic tank occurs in a separate and distinct leaching area.

Further objects and advantages will become apparent from the following description of the invention taken in conjunction with the figures, in which:

FIG. 2 is a top view partially in section of the tank of FIG. 1;

FIG. 3 is a fragmentary vertical elevation including a cut-out sectional view illustrating stacked block members in accordance with the invention;

FIG. 4 is a perspective view of one of such block members;

FIGS. 5 and 6 are perspective views of the inlet and outlet conduits, respectively;

FIG. 7 is a fragmentary partly in section exploded view of the concentric forms including the plugs and cores for forming the block members; and FIG. 8 is a fragmentary elevational view in section illustrating the components of FIG. 7 in assembled relationship at the time of curing a block member.

Figure 1:
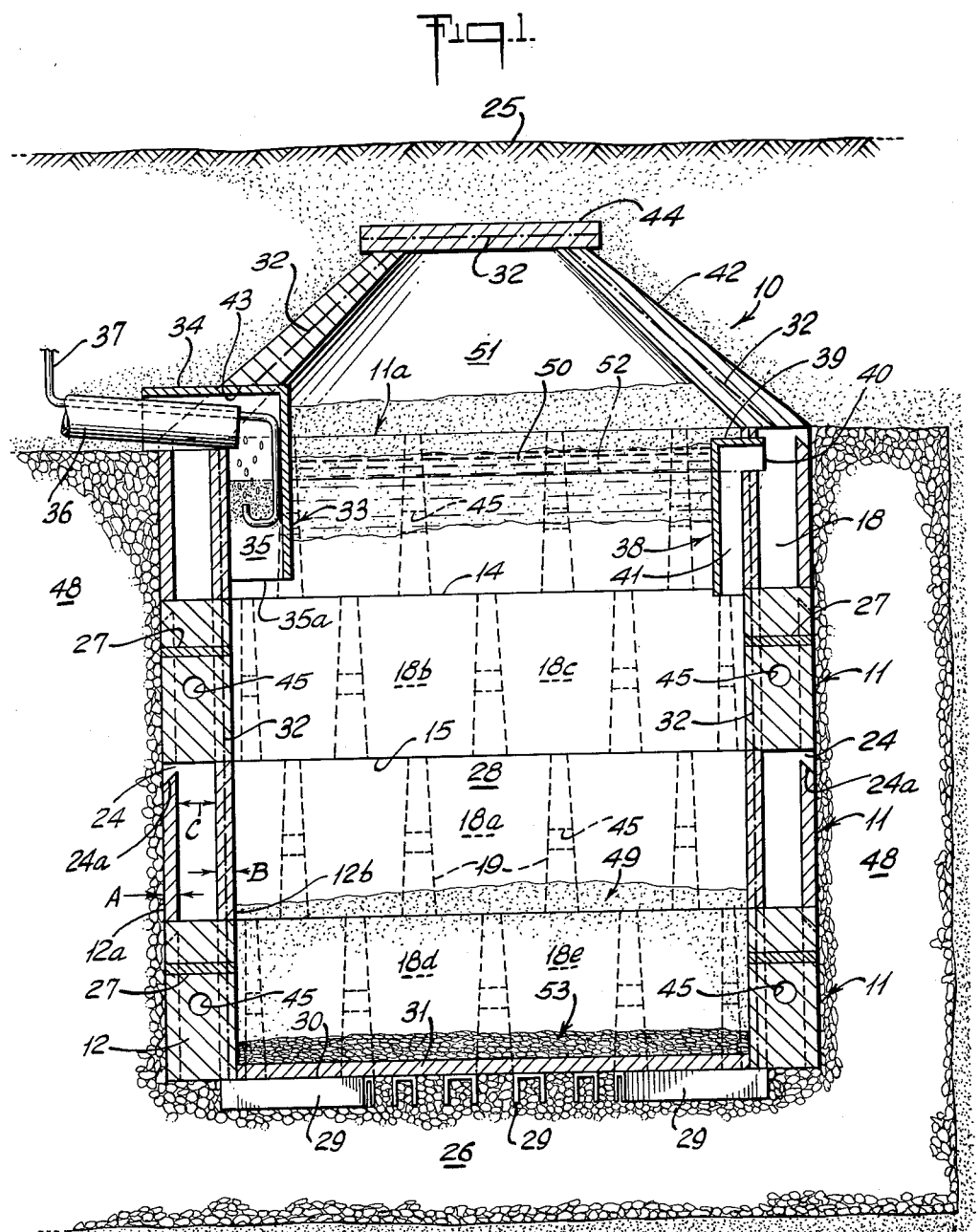
FIG. 1 is a cross-sectional view in elevation along line 1—1 of FIG. 2 and shows a septic tank in accordance with the instant invention.

Reference is now made to the figures which show a preferred embodiment of the invention. A septic tank 10 is constituted by a plurality of precast re-enforced concrete-like block members 11. Members 11 are stacked vertically one on top of the other, as shown in FIGS. 1 and 3. Each block member 11, note FIG. 4, is ring-shaped to provide optimum structural strength. The ring-shaped member 11 is defined by a cylindrical peripheral side wall 12 of preselected thickness and a large cylindrical open ended interior bore 13. Block member 11 has a preselected vertical height measured between the planes of the flat upper and lower edge faces 14, 15 of wall 12. Precast members 11 may be formed individually by pouring concrete-like material into suitably spaced concentric forms 16, 17 depicted in FIGS. 7 and 8. Each block member 11 is also provided with a plurality of similarly shaped dispersive chambers 18 mutually spaced apart in the interior of its peripheral side wall structure 12. Chambers 18 are open ended with the upper open ends thereof at the flat upper edge face 14 of wall 12. The lower open ends of chambers 18 are at the flat lower edge face 15 of wall 12. For optimum dispersive flow of sewage through chambers 18 and for ease of fabrication of same, dispersive chambers 18 are substantially trapezoidal in horizontal cross-section, and the opposed side walls 19 thereof are inclined inwardly and downwardly whereby the cross-sectional area of each chamber 18 diminishes in a direction from its top edge face 14 to its bottom edge face 15.

When forming the individual block members 11, the pair of spaced concentric forms 16, 17 are placed on a horizontal floor. Chambers 18 are formed by a plurality of truncated plugs 20. Plugs 20 may be made of wood. Each plug 20 has a body portion 21 of trapezoidal cross-section for forming an individual chamber 18. Plugs 20 are hooked over the tops of forms 16, 17 as depicted in FIG. 8 with the individual plugs circumferentially spaced apart around the forms. The concentric space between forms 16, 17 define the cross-sectional width and height of the peripheral side wall 12 of block member 11. Plug body portions 21 coextend between and are spaced from the confronting surfaces of the inner wall face of outer form 16 and the outer wall face of inner form 17 to define the cross-sectional widths of the sections constituting wall 12, such as the outer section width "A"; chamber width "C"; and the inner section width "B," as depicted in FIGS. 1 and 8. A ring-like metal mesh or wire depicted at 32 is inserted between forms 16, 17, in section B, and serves to re-enforce the precast concrete block member 11. If desired, re-enforcing mesh also may be embodied in the outer region "A" of block walls 12 to re-enforce same against external loads. Concrete is poured into the region between forms 16, 17 and upon curing same, plugs 20 are removed to form the open ended through passages defining dispersive chambers 18. One side of each plug 20 is provided with a radial projection 22 including an outwardly and downwardly inclined wall 23 for forming the chamfer shaped outlet ports 24 of the individual chambers 18 along the outer wall surface 12a.

In assembling a septic tank such as 10, a hole of suitable diameter and depth is dug below ground level 25. The base of the hole is filled a suitable depth with washed gravel 26. A block member 11 is lowered into the hole and placed on gravel base 26. Each block member 11 is preferably provided with a pair of opposed wall holes 27 to which cable or other suitable means is fastened for lowering the block members 11 into the ground hole. Individual ones of additional block members 11 are vertically stacked one on top of the other on the first member 11 in a manner whereby the interior bores 13 thereof are aligned to form a septic tank chamber 28 as depicted in FIG. 1. The flat lower edge face 15 of one block member 11 rests directly upon the flat upper edge face 14 of an adjacent block member. The number of block members constituting the stacked assembly are determined by the desired height of the septic tank. A plurality of longitudinal inverted U-shaped and open ended channels 29 are embedded in gravel floor 26 at a level wherein the roof surfaces 30 of channels 29 are substantially coplanar to receive a concrete slab 31 for sealing the bottom end of septic tank chamber 28, as shown in FIG. 1. Channels 29 extend radially approximately from under dispersive chambers 18 towards the center of the circular cross-sectional area of tank 10. Channels 29 are mutually spaced apart angularly and the spaces between adjacent channels are filled with washed gravel to complete the drainage bed defined by gravel base 26.

When stacking each block member one on top of the other, the adjacently stacked members are circumferentially oriented one with respect to the next, whereby the dispersive chambers 18 of adjacent block members are off set. This establishes an arrangement as depicted in FIGS. 1 and 2, whereby it is seen that a chamber such as 18a of one block member communicates with a pair of chambers such as 18b, c, d and e of the adjacent block members immediately above and below the first member to increase circumferential dispersive discharge of sewage flowing downwardly through chambers 18. Slab 31 is lowered into position after block members 11 are stacked.

Septic tank 10 then may be provided with inlet and outlet means at diametrically opposite portions of uppermost block member 11a. The inlet means involves a U-shaped elbow or conduit 33 of precaset concrete or other like material. Conduit 33 has opposed open ends as well as one open side, note FIG. 5. The upper arm 34 of inlet conduit 33 rests on top edge face 14 of upper member 11a as depicted in FIG. 1. The open side wall of U-shaped conduit 33 confronts the interior wall surface 12b of upper member 11a to define a substantially enclosed inlet chamber 35 except for its open ends. Inlet conduit 33 is ultimately sealed to its illustrated position by cementing along the lower arm edges of conduit 33 contiguous with interior wall surface 12b of upper member 11a in accordance with customary practice. A conventional inlet waste pipe 36 extends into the upper arm of conduit 33 and terminates thereat. Inlet pipe 36 couples to a building sewer and feeds sewage therefrom to septic tank chamber 28 by dropping same through inlet chamber 35.

It is also in accordance with the instant invention to introduce a fresh air line 37 into inlet chamber 35. Fresh air line 37 has an upwardly turned end in inlet chamber 35, whereby air or other oxygen carrying gas may be pumped into inlet chamber 35. The pumped air is thus forced vertically upward against the downward passage of waste through inlet chamber 35. The waste, in particular, the solids thereof, breaks up as it passes through chamber 35. This is facilitated by agitation caused by the pumped air. Ultimately, the waste passes the open chamber end 35a and enters septic tank chamber 28.

Outlet means involves a U-shaped elbow or conduit 38 of precast concrete or like material substantially similar in shape to inlet conduit 33 except that outlet conduit 38 is scaled down in size. Attachment of outlet conduit 38 to the interior wall surface 12b of upper block member 11a is also similar as noted hereinbefore except that the end of the conduit upper arm 39 passes through a hole made in the inner wall 12b of member 11a whereby the open end 40 of the outlet chamber 41 defined by conduit 38 communicates with one of the dispersive chambers 18 in member wall 12. It would be within the scope of the invention to use more than one outlet chamber to enhance circumferential distribution of liquid waste from chamber 28 into dispersive chambers 18. For example, if two additional outlet chambers are used, they may be formed by an additional pair of outlet conduits (not shown) identical to conduit 38. Each of the additional conduits would be supported by block member 11a in the same manner and height as for conduit 38, whereby the additional conduits are preferably spaced approximately 90° from conduit 38 with each on an opposite side of conduit 38.

The upper end of chamber 28 is enclosed by a truncated cone-shaped top member 42 which is preferably precast and of concrete-like material. Member 42 includes re-enforcing mesh wire 32. A through passage 43 along the wall of member 42 fits over upper arm 34 of conduit 33. Member 42 fits over chamber 28 and seats on the upper edge face 14 of upper block member 11a. Member 42 has a central manhole opening at its top which may be closed by a horizontal precast and wire re-enforced slab cover 44 of concrete-like material. It will be understood that before completely enclosing septic chamber 28, the various joints between the stacked block members 11, such as along interior chamber wall 12b, and floor slab 31, cone member 42 and cover slab 44 are mortar sealed whereby septic chamber 28 except for its inlet and outlet means is liquid and gas tight.

It is also in accordance with the current invention to enhance circumferential dispersive flow of sewage waste as it moves downwardly through the various dispersive chambers 18 of tank 10. Such dispersive sewage flow is depicted by the flow arrows in FIG. 3. This is effected by joining adjacent ones of chambers 18 of each block member 11 by horizontal passages 45. Passages 45 are formed by short cylindrical and relatively stiff cores 46 held horizontally between adjacent plugs 20, as shown in FIG. 7, at the time of pouring and curing the individual block members 11. The confronting side walls 47 of plugs 20 have opposed recesses for receiving the ends of cores 46 for holding said cores in position as block members 11 are formed. Cores 46 may be made of a mixture of sand and molasses. The molasses serves as a binder, however, cores 46 need not be removed upon removal of plugs 20 and separation of members 11 from forms 16, 17. The molasses core 46 will gradually dissolve away during use of septic tank 10.

Each dispersive chamber 18 of the stacked assembly has an outlet leaching port 24, formed in its outer wall 12a by a chamfered ledge 24a and the opposed lower edge face 15 of the upper adjacent block member. This arrangement enhances circumferential distribution of clarified liquid waste from tank 10 into the vertical region 48 surrounding the stacked assembly. To effect desired drainage and zoogloeal decomposition of this liquid waste released through ports 24, region 48 surrounding tank 10 as well as base region 26 are filled with washed gravel.

It will be understood that the assembly constituting septic tank 10 by means of precast components, in particular, vertical tiers of block members 11, measurably reduces the cost and time to fabricate and assemble the septic tank and measurably increases the ease in which such tank can be assembled. In addition to these extremely desirable and important advantages afforded by the invention, the size and height of tank 10 may be selected at will by increasing or decreasing, as desired, the number of tiers and height of block members 11 and by varying diametrical size of its bore 13. As an example of one embodiment of tank 10, block members 11 constituting same were made with an overall outside diameter of 8 feet and 10 inches and with an inside diameter of 7 feet for bore 13. The width of tank wall 12 measures 10 inches wherein the cross-sectional width "A" (Fig. 1) of its outer wall section 12a measures 2 inches, the cross-sectional width "C" of chamber 18 measures 4 inches and the cross-sectional width "B" of the re-enforced inner wall portion 12b measures 4 inches. The vertical height of individual block members 11 measures 2 feet and 2 inches between its opposed upper and lower edge faces 14, 15. These dimensions should be taken merely as illustrative and not in any limiting sense.

The untreated liquid waste or sewage from a building, if discharged directly into the sub-soil, will quickly clog same except for the most porous gravel soil formations. The amount of clogging caused by tank effluent will vary directly with the amount of suspended solids in the liquid waste discharged into the sub-soil. It is the main function of a septic tank to treat the sewage from the building so that the liquid waste released by the septic tank readily percolates into the sub-soil without clogging. Hence, it is a principal function of a septic tank to protect the absorbtion characteristics of the sub-soil. Septic tank 10 in accordance with the invention is of such construction to define operation wherein wastes deposited therein, both liquid and solids, are effectively decomposed and clarified by bacterial, biochemical, physical and natural processes whereby the effluent discharged thereby is substantially free of suspended solids with the result that the clarified waste will freely percolate into the sub-soil without any danger of clogging. Initial decomposition occurs in inlet chamber 35, wherein the wastes passing through such chamber are subject to aerobic digestion by virtue of mixture with the air pumped in by line 37. The second phase of such bacterial and natural process digestion and decomposition is attributed to the anaerobic treatment occurring in septic tank chamber 28. Anaerobic bacteria thrives in the absence of free oxygen, hence air line 37 is arranged whereby the air employed in inlet chamber 35 is forced to flow upwardly to prevent oxygen from entering septic tank chamber 28. As the waste drops into septic tank chamber 28, its velocity of flow is measurably reduced whereby the larger or heavier solids thereof sink to the bottom of chamber 28 to form a blanket of sludge 49. On the other hand, the light solids including fats, greases and gases, rise to the surface of the liquid waste contained in septic chamber 28 to form a grease zone commingled with a bacteria mat 50. The decomposition and digestion of the waste in chamber 28 among other things results in a liberation of gases which accumulate to form a gas head in space 51 above the grease-bacteria zone 50. The accumulated gases 51 also contribute to the natural process decomposition of the waste in chamber 28. The liquid waste contained in chamber 28 is depicted as having a flow line at 52. With continuous anaerobic treatment of the waste in chamber 28 over an appreciable length of time, a considerable portion of sludge 49 and the floating solids at 50 are liquefied and gasified by decomposition and digestion. This process compacts the remaining solids into a small volume. Also during this process, the gas liberated from the sludge zone 49 carries a portion of such solids to the grease zone 50. On the other hand, compacting solids in the grease zone upon becoming heavier sink to sludge zone 49. Ultimately, the sludge matter and to a lesser degree the floating solid matter in zone 50 compact to a very small volume which gradually settles at the bottom of tank 28 and forms a small residue of relatively inert solid 53 thereat. It will be noted that the inlet and outlet conduits 33, 38, in particular, the lower open ends thereof are below and free of the grease zone accumulation. Conduits 33, 38 serve as baffles securing inlet and outlet chambers 35, 41 against clogging by the grease zone accumulation. The clarified liquid waste extends into outlet chamber 41 and is discharged thereby into the various dispersive chambers 18. As the clarified waste drops, it also circumferentially flows around tank 10 as depicted in FIG. 3. The liquid waste is released by the dispersive chambers 18 through leaching ports 24 thereof for drainage into the surrounding circumferential region constituted by gravel bed 48. As for the liquid which continues to drop through chambers 18 to the bottom of tank 10, it is distributed through gravel bed 26 with the aid of channels 29. The last phase of decomposition and treatment of the waste is effected by the zoogloeal phenomenon accomplished by the washed gravel in regions 26, 48 through which the waste liquid drains before it is discharged and percolates into the sub-soil. Among other advantages, the operatively associated treatments, i.e. aerobic, anaerobic and zoogloeal, in and surrounding tank 10 provides a unitary sewer system in contrast to a system employing a septic tank and leaching the liquid therefrom in a second tank or leaching bed separate and distinct from the first tank. Hence, the instant inventiton accomplishes substantial economy in the sewer system by employing a composite and unitary tank for the entire treatment.

It is intended that all matter contained in the above description or shown in the accompanying drawings shall be interpreted as illustrative and not in a limiting sense.

What is claimed is:

1. A septic tank for treating sewage waste and disposing of same comprising, a plurality of vertically stacked ring-shaped block members, each block member having a peripheral wall of selected cross-sectional height and thickness, the vertical height of a peripheral block wall extending from a top edge to a bottom edge of the block, the peripheral wall of a block member having spaced inner and outer faces defining its cross-sectional thickness wherein each block member has a hollow open ended interior defined by the inner face of its peripheral wall, the hollow interiors of said stacked block members being aligned to define a substantially enclosed vertical septic tank chamber for effecting anaerobic treatment of the waste therein and wherein the sewage waste in such tank defines a flow line near the top end of said septic tank chamber, means at the top and bottom ends of said septic tank chamber for enclosing same, said block members having annularly spaced apart effluent dispersive chambers in the peripheral walls thereof, said dispersive chambers being open ended at the top and bottom edges of the peripheral block walls, said stacked members being arranged wherein the dispersive chambers of adjacent ones of said stacked block members are off-set whereby a dispersive chamber of one block member communicates with a pair of dispersive chambers of an adjacent one of said block members, means along the outer face of said stacked block members for discharging sewage flow through such dispersive chambers into the region that is exterior of said stacked block members, outlet means for passing digested sewage from said septic tank chamber into said dispersive chambers, said outlet means including a susbtantially enclosed chamber having an inlet mouth communicating with said septic tank chamber below the waste flow line and an outlet mouth spaced vertically above said inlet mouth and communicating with said dispersive chambers, inlet means for receiving sewage waste to be treated from a source and for passing same into said septic tank chamber, said inlet and outlet means being substantially at the same horizontal level with respect to said septic tank chamber and also being at relatively diametrically opposite sides of said septic tank chamber, said inlet means including a conduit member defining a vertical chamber substantially isolated from said septic tank chamber, said inlet means chamber having a first mouth below said flow line and communicating with said septic tank chamber for discharging sewage flow through said inlet chamber into said septic tank chamber below said flow line, said inlet means chamber having a second mouth vertically above its first mouth for receiving the sewage to be treated from the source, and means for pumping an oxygen carrying gas into said inlet means chamber for effecting aerobic digestion of sewage dropping vertically down said inlet chamber, whereby said oxygen is substantially isolated from said septic tank chamber to prevent suppression of anaerobic treatment of the sewage in said septic tank chamber, said flow line being substantially level with the outlet mouth of said outlet means for supporting a substantially continuous and unbroken bacteria mat contributing to the anaerobic treatment of waste in said septic tank chamber, said bacteria mat being supported by said flow line above the first mouth of said inlet means and the inlet mouth of said outlet means, said bacteria mat also cooperating with said enclosing means at the top and of said septic tank chamber for containing a substantially enclosed gas head therebetween relatively free of oxygen, said gas head contributing to the anaerobic treatment of said waste in said septic tank chamber.

2. Apparatus as defined in claim 1 wherein, said gas means being a conduit having an orifice oriented for releasing the gas flow in an upward direction against the direction of flow of sewage through said inlet conduit chamber.

3. Apparatus as defined in claim 1 wherein, the peripheral wall of each block member also includes passageways for connecting adjacent ones of the dispersive chambers in each block member, whereby sewage dropping downwardly through such dispersive chambers may also flow circumferentially around a block member from one of its dispersive chambers to its adjacent chamber through such connecting passageways.

4. Apparatus as defined in claim 8 wherein said block members constituting the assembled stack are made of preformed concrete-like material and said means along the outer faces of said stacked block members include at least one outlet port communicating with an individual one of said dispersive chambers, said means at the top and bottom ends of the stacked assemblage including, a concrete-like slab co-operating with a lower one of said block members for enclosing the bottom of said septic tank chamber and a concrete-like cover operatively associated with the upper one of said block members for enclosing the top of said septic tank chamber.

5. Apparatus as defined in claim 4 further including, a region of gravel extending radially outwardly from the outer face of the peripheral walls of the stacked block members and surrounding such stacked blocks for receiving the digested sewage discharged from said dispersive chambers for the purpose of effecting zoogloeal digestion and dispersive drainage of the liquid sewage discharge from said septic tank chamber.

6. Apparatus as defined in claim 5 wherein, gravel also occupies the region underneath the stacked block assemblage including the region directly underneath the aforesaid first-mentioned concrete slab.

7. Apparatus as defined in claim 6 further including, channel means embedded in the gravel underneath the stacked assemblage for radially dispersing sewage from said septic tank chamber throughout the region of gravel underneath the aforesaid first-mentioned concrete slab.

8. Apparatus as defined in claim 1 wherein, the dispersive chambers are substantially rectangular in horizontal cross-section, said dispersive chambers also being tapered to define a gradually smaller cross-sectional area from its top open end towards its bottom open end.

9. A septic tank for sewage disposal comprising, a plurality of stacked concrete-like members forming a hollow and upright interior, means at the top and bottom ends of said stacked assembly for enclosing same wherein the aforesaid interior defines a septic tank chamber for effecting anaerobic treatment of sewage waste therein, a substantially enclosed outlet conduit having an outlet mouth for passing digested waste from said tank chamber into a region surrounding the exterior of said chamber, said outlet mouth defining a liquid waste flow line in said chamber substantially level with said outlet mouth, said outlet conduit also having an inlet mouth communicating with said chamber and spaced vertically below said flow line for passing waste through said outlet conduit for discharge to said exterior region, a substantially enclosed inlet conduit supported in said chamber substantially level with said outlet conduit and diametrically opposite thereto, said inlet conduit having a discharge mouth vertically below said flow line and an intake mouth vertically above said discharge mouth, said intake mouth being equipped to receive sewage waste and passing same through said inlet conduit for discharge into said septic tank below said flow line, means for pumping oxygen into said inlet conduit to effect aerobic digestion of sewage passing through said inlet means in relative isolation with respect to treatment of sewage in said septic tank, whereby the oxygen effecting aerobic treatment of the sewage in said inlet conduit does not seep into said septic tank to interfere with anaerobic treatment of waste therein, said flow line supporting a continuous and relatively unbroken bacteria mat contributing to the anaerobic treatment of waste in said septic tank chamber, said bacteria mat cooperating with the enclosing top end of said chamber to define a substantially enclosed gas head relatively free of oxygen therebetween for contributing to the anaerobic treatment of waste in said septic tank chamber, and means exterior of said chamber for receiving the treated waste for effecting zoogloeal digestion and dispersive drainage of the liquid sewage discharge from said chamber.

References Cited in the file of this patent

UNITED STATES PATENTS

| | | |
|---|---|---|
| 1,223,004 | Starr | Apr. 17, 1917 |
| 1,331,735 | Wilson | Feb. 24, 1920 |
| 1,408,810 | Lawrence | Mar. 7, 1922 |
| 1,788,101 | Gates | Jan. 6, 1931 |
| 1,788,718 | Horten | Jan. 13, 1931 |
| 2,069,058 | Davis | Jan. 26, 1937 |
| 2,483,564 | Sitton | Oct. 4, 1949 |
| 2,875,151 | Davidson | Feb. 24, 1959 |

FOREIGN PATENTS

| | | |
|---|---|---|
| 19,915 | Great Britain | Oct. 12, 1914 |
| 3,831 | Great Britain | Mar. 10, 1915 |
| 547,052 | Italy | Aug. 6, 1956 |